United States Patent
Tsuchida

(10) Patent No.: US 12,276,331 B2
(45) Date of Patent: Apr. 15, 2025

(54) TRANSMISSION INCLUDING A BAFFLE PLATE

(71) Applicants: JATCO Ltd, Fuji (JP); NISSAN MOTOR CO., LTD., Yokohama (JP)

(72) Inventor: Akira Tsuchida, Sagamihara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/256,656

(22) PCT Filed: Oct. 15, 2021

(86) PCT No.: PCT/JP2021/038258
§ 371 (c)(1),
(2) Date: Jun. 9, 2023

(87) PCT Pub. No.: WO2022/130768
PCT Pub. Date: Jun. 23, 2022

(65) Prior Publication Data
US 2024/0035559 A1    Feb. 1, 2024

(30) Foreign Application Priority Data
Dec. 15, 2020   (JP) .................... 2020-207680

(51) Int. Cl.
*F16H 57/04*   (2010.01)

(52) U.S. Cl.
CPC ..... *F16H 57/0423* (2013.01); *F16H 57/0457* (2013.01)

(58) Field of Classification Search
CPC ... F16H 57/0423; F16H 57/0457; F16H 57/05

USPC ......................................... 184/11.1
See application file for complete search history.

(56) References Cited

U.S. PATENT DOCUMENTS

| | | | | |
|---|---|---|---|---|
| 4,693,133 | A  * | 9/1987 | Tomita ............... | F16H 57/0006 |
| | | | | 184/6.12 |
| 6,238,312 | B1 * | 5/2001 | Tsubata .............. | F16H 57/0489 |
| | | | | 474/146 |
| 6,616,432 | B2 * | 9/2003 | Szczepanski .......... | F04C 2/082 |
| | | | | 184/6.12 |
| 7,421,921 | B2 * | 9/2008 | Kimura ................ | F16H 57/043 |
| | | | | 184/6.12 |
| 7,686,137 | B2 * | 3/2010 | Tominaga ............ | F16H 57/0408 |
| | | | | 184/6.12 |

(Continued)

FOREIGN PATENT DOCUMENTS

JP     2012-102818  A    5/2012

*Primary Examiner* — Henry Y Liu
(74) *Attorney, Agent, or Firm* — Foley & Lardner LLP

(57) ABSTRACT

A device includes a case; a first rotating body that has at least a part immersed in the oil in an oil bath; a second rotating body disposed in the case at a position not immersed in the oil in the oil bath; a plate; a first wall portion provided on the plate between the first rotating body and the second rotating body; a second wall portion provided above the first wall portion in a gravity direction and extending toward a direction away from the first rotating body; and a fourth wall portion provided between the first rotating body and the second rotating body and extending in a vertical direction on the plate, wherein the first wall portion is provided on a first rotating body side of the plate, and the fourth wall portion is provided on a second rotating body side of the plate.

4 Claims, 3 Drawing Sheets

(56) References Cited

U.S. PATENT DOCUMENTS

| | | | | |
|---|---|---|---|---|
| 8,875,841 | B2* | 11/2014 | Yoshimi | F16H 57/0409 |
| | | | | 184/6.12 |
| 9,435,421 | B2* | 9/2016 | Mafune | F16H 57/0483 |
| 9,631,715 | B1* | 4/2017 | Steward | F16H 7/18 |
| 10,208,848 | B2* | 2/2019 | Hotait | F16H 57/0463 |
| 10,309,519 | B2* | 6/2019 | Zhang | F16H 57/05 |
| 10,837,541 | B2* | 11/2020 | Itou | F16H 57/0421 |
| 10,907,724 | B2* | 2/2021 | Akiyama | F16H 57/0421 |
| 11,585,426 | B2* | 2/2023 | Toyoshima | F16H 57/0483 |
| 2006/0060424 | A1* | 3/2006 | Tominaga | F16H 57/0423 |
| | | | | 184/11.1 |
| 2006/0065487 | A1* | 3/2006 | Tominaga | F16H 57/05 |
| | | | | 184/6.12 |
| 2015/0337947 | A1* | 11/2015 | Steward | F15D 1/0005 |
| | | | | 184/6.12 |
| 2017/0108111 | A1* | 4/2017 | Steward | F16H 57/0457 |
| 2019/0085971 | A1* | 3/2019 | Itou | F16H 57/04 |
| 2019/0145509 | A1* | 5/2019 | Yu | F16H 57/0421 |
| | | | | 184/11.1 |
| 2020/0263781 | A1* | 8/2020 | Akiyama | F16H 57/0457 |
| 2020/0263782 | A1* | 8/2020 | Toyoshima | F16H 57/0483 |

* cited by examiner

TRANSMISSION INCLUDING A BAFFLE PLATE

TECHNICAL FIELD

The present invention relates to a device.

BACKGROUND ART

Patent Literature 1 discloses a transmission including a baffle plate that divides an oil reservoir in a case.

The baffle plate has a separation wall partitioning a space on a final gear side and a space on a driven sprocket side of an oil pump, and is implemented to prevent stirring of oil when the final gear and the driven sprocket rotate.

PRIOR ART DOCUMENT

Patent Document

Patent Document 1: JP2012-102818A

SUMMARY OF INVENTION

In the above structure, in a case where oil swirled up by the final gear (first rotating body) is scattered over the separation wall, it is considered that the oil is stirred by being splashed on a drive sprocket (second rotating body) that drives the driven sprocket, a chain that connects the drive sprocket and the driven sprocket, or the like.

The present invention is implemented in view of such a technical problem, and an object of the present invention is to prevent the oil swirled up by the first rotating body from being splashed on a second rotating body side and stirred.

According to one aspect of the present invention, a device includes a case forming an oil bath in which oil is stored, a first rotating body disposed in the case and having at least a part immersed in the oil in the oil bath, a second rotating body disposed in the case and provided on a radially outer side of the first rotating body, a first wall portion provided between the first rotating body and the second rotating body, and a second wall portion provided above the first wall portion in a gravity direction and extending toward a direction away from the first rotating body.

According to the above aspect, the device includes a second wall portion provided above a first wall portion in the gravity direction and extending toward a direction away from the first rotating body. Therefore, the oil swirled up by the first rotating body and splashed to go beyond the first wall portion can be blocked by the second wall portion. Accordingly, it is possible to prevent the oil swirled up by the first rotating body from being splashed on the second rotating body side and stirred.

DESCRIPTION OF EMBODIMENTS

Hereinafter, a vehicle 100 including a power transmission device 10 as a device according to an embodiment of the present invention will be described with reference to the accompanying drawings.

Figure 1:
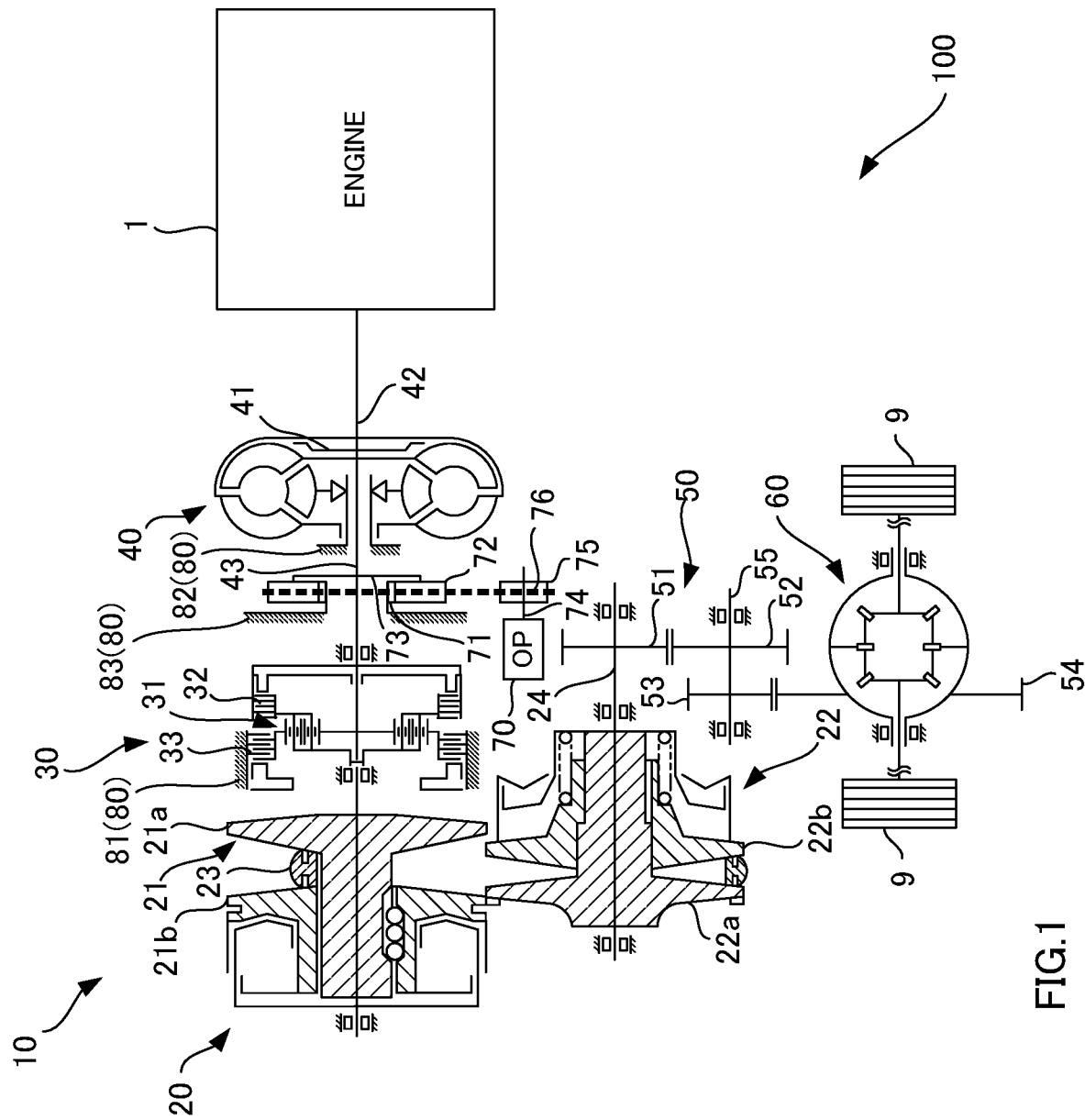
FIG. 1 is a schematic diagram for illustrating a schematic configuration of a vehicle including a device according to an embodiment of the present invention.

FIG. 1 is a schematic diagram for illustrating a schematic configuration of the vehicle 100. As illustrated in FIG. 1, the vehicle 100 includes an engine 1, and the power transmission device 10 provided in a power transmission path connecting the engine 1 and driving wheels 9.

In the present embodiment, the power transmission device 10 is a transmission, and includes a variator 20, a forward/reverse switching mechanism 30, a torque converter 40, a gear set 50, a differential gear device 60, an oil pump 70, and a case 80 that accommodates those.

In the vehicle 100, rotation generated in the engine 1 is transmitted to the driving wheels 9 via the torque converter 40, the forward/reverse switching mechanism 30, the variator 20, the gear set 50, and the differential gear device 60.

The torque converter 40 has a lock-up clutch 41, and when the lock-up clutch 41 is engaged, an input shaft 42 and an output shaft 43 of the torque converter 40 are directly connected, and the input shaft 42 and the output shaft 43 rotate at the same speed.

The variator 20 includes a primary pulley 21 and a secondary pulley 22 that are arranged such that V-shaped grooves are aligned, and a belt 23 that is wound around the V-shaped grooves of the pulleys 21 and 22.

The engine 1 is disposed coaxially with the primary pulley 21, and the torque converter 40 and the forward/reverse switching mechanism 30 are provided between the engine 1 and the primary pulley 21 in this order from an engine 1 side.

The forward/reverse switching mechanism 30 includes a double pinion planetary gear set 31 as a main component, a sun gear thereof is coupled to the output shaft 43 of the torque converter 40, and a carrier thereof is coupled to the primary pulley 21 of the variator 20. The forward/reverse switching mechanism 30 further includes: a forward clutch 32 that directly connects the sun gear and the carrier of the double pinion planetary gear set 31; and a reverse brake 33 that fixes a ring gear. When the forward clutch 32 is engaged, input rotation from the output shaft 43 is transmitted to the primary pulley 21 without changing a rotation direction, and when the reverse brake 33 is engaged, the input rotation from the output shaft 43 is reversed and is transmitted to the primary pulley 21.

The forward clutch 32 is engaged by being supplied with a clutch pressure from a hydraulic control valve unit (not illustrated) when a forward traveling mode is selected as a traveling mode of the vehicle 100. The reverse brake 33 is engaged by being supplied with a brake pressure from the hydraulic control valve unit when a reverse traveling mode is selected as the traveling mode of the vehicle 100.

Rotation of the primary pulley 21 is transmitted to the secondary pulley 22 via the belt 23, and rotation of the secondary pulley 22 is transmitted to the driving wheels 9 via an output shaft 24, the gear set 50, and the differential gear device 60.

In order to make it possible to change a speed ratio between the primary pulley 21 and the secondary pulley 22 during the above-mentioned power transmission, among conical plates forming the V-shaped grooves of the primary pulley 21 and the secondary pulley 22, one type is referred to as fixed conical plates 21*a* and 22*a*, and the other type is referred to as movable conical plates 21*b* and 22*b* that can be displaced in an axial direction.

These movable conical plates 21*b* and 22*b* are biased toward the fixed conical plates 21*a* and 22*a* by supplying a primary pulley pressure and a secondary pulley pressure from the hydraulic control valve unit, whereby the belt 23 is frictionally engaged with the conical plates to perform power transmission between the primary pulley 21 and the secondary pulley 22.

At the time of gear shift, a width of the V-shaped grooves of both the pulleys 21 and 22 is changed by a differential pressure between the primary pulley pressure and the secondary pulley pressure generated corresponding to a target speed ratio, and a looping arc diameter of the belt 23 with respect to the pulleys 21 and 22 is continuously changed, thereby realizing the target speed ratio.

The gear set 50 includes a first gear 51 provided on the output shaft 24 of the variator 20, a second gear 52 and a third gear 53 provided on an intermediate shaft 55, and a fourth gear 54 serving as the first rotating body fixed to the differential gear device 60.

The case 80 includes a main body portion 81, a cover 82, an intermediate cover 83, and an oil pan (not illustrated). The case 80 forms an oil bath in which oil is stored.

The intermediate cover 83 is provided between the torque converter 40 and the forward/reverse switching mechanism 30 so as to cover a torque converter 40 side of the forward/reverse switching mechanism 30.

A drive sprocket 72 serving as the second rotating body is rotatably supported by the intermediate cover 83 via a bush 71. The drive sprocket 72 is connected to the output shaft 43 of the torque converter 40 via a connecting member 73, and the drive sprocket 72 is further connected to the driven sprocket 75 provided on an input shaft 74 of the oil pump 70 via a chain 76. As a result, when the output shaft 43 of the torque converter 40 rotates, the oil pump 70 is driven to supply oil to the hydraulic control valve unit.

Next, a configuration of an inside of the power transmission device will be described in detail with reference to FIG. 2.

Figure 2:
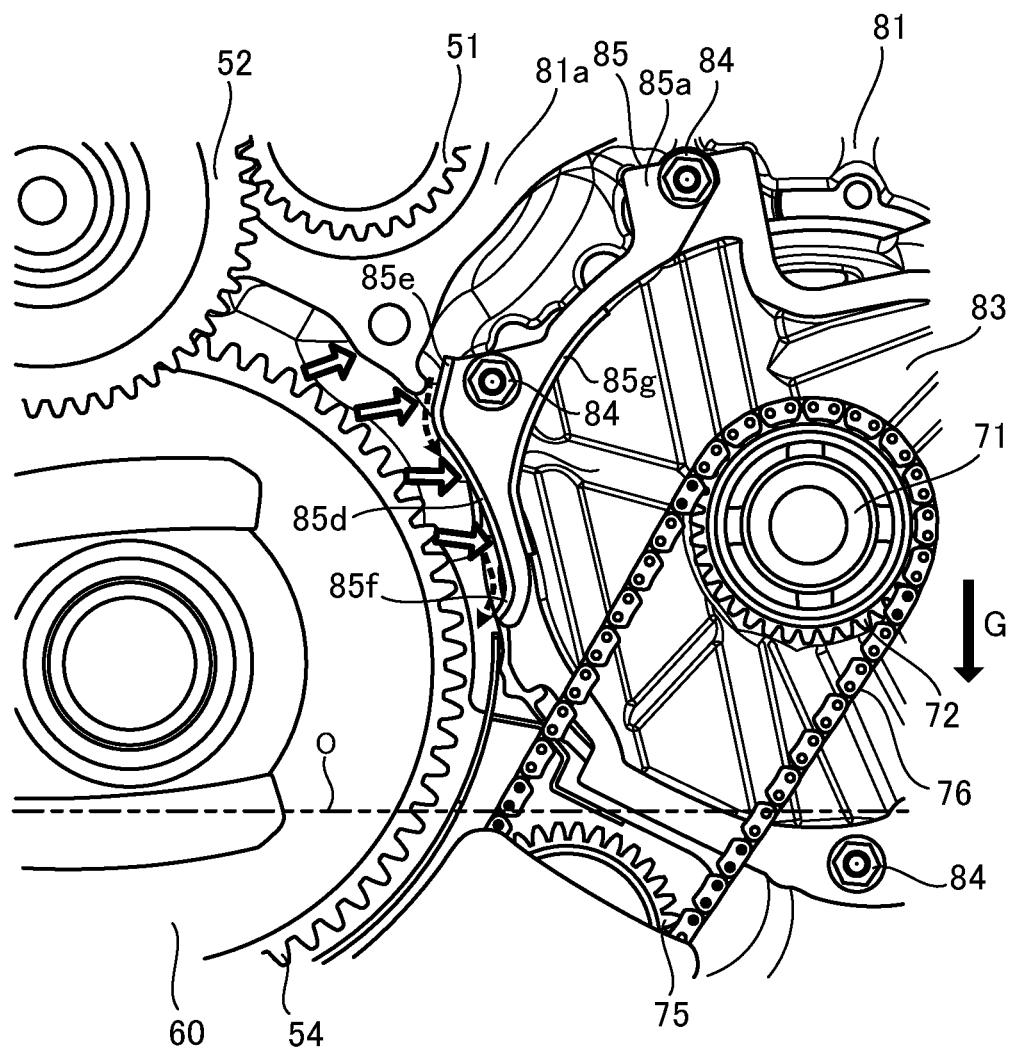
FIG. 2 is a view of an inside of the device as viewed from a torque converter side.

FIG. 2 is a view of the inside of the power transmission device 10 as viewed from the torque converter 40 side. A left-right direction in FIG. 2 corresponds to a front-rear direction of the vehicle 100 (the right direction is the front direction), and a direction perpendicular to a paper surface corresponds to a left-right direction of the vehicle 100 (the depth direction of the paper surface is the left direction). In addition, a solid arrow G indicates the direction of gravity, and a two-dot chain line indicates a height of an oil level O of the oil stored in the oil bath.

As illustrated in FIG. 2, the differential gear device 60 to which the fourth gear 54 is fixed is disposed on a rear side of the vehicle 100 in the power transmission device 10.

The drive sprocket 72 rotatably supported by the intermediate cover 83 via the bush 71 is disposed on a radially outer side of the fourth gear 54 and on a front side of the vehicle 100 in the power transmission device 10. That is, the drive sprocket 72 and the fourth gear 54 are disposed side by side in the front-rear direction of the vehicle 100.

The forward/reverse switching mechanism 30 and the primary pulley 21 are located on a left side (depth side of paper surface) of the vehicle 100 with respect to the drive sprocket 72, and are not illustrated in FIG. 2.

The intermediate cover 83 is fixed to the main body portion 81 by a plurality of bolts 84.

The driven sprocket 75 is disposed below the drive sprocket 72. The drive sprocket 72 and the driven sprocket 75 are connected by the chain 76.

The oil pump 70 is located on the left side of the vehicle 100 with respect to the driven sprocket 75, and is not illustrated in FIG. 2.

The first gear 51, the second gear 52, and the third gear 53 are disposed above the differential gear device 60.

The secondary pulley 22 is located on the left side of the vehicle 100 with respect to the first gear 51, and is not illustrated in FIG. 2. The third gear 53 is located on the left side of the vehicle 100 with respect to the second gear 52, and is not illustrated in FIG. 2.

The fourth gear 54 fixed to the differential gear device 60 is disposed such that a part thereof is immersed in the oil stored in the oil bath. Therefore, in a case where the fourth gear 54 rotates clockwise in FIG. 2, as indicated by outlined arrows, the oil swirled up by the fourth gear 54 is splashed on a drive sprocket 72 side.

When the splashed oil is splashed on the drive sprocket 72 or the chain 76, air contained in the oil is increased due to stirring of the oil, and it is considered that sound is generated when the oil pump 70 sucks the oil and durability of the oil pump 70 is affected. In addition, it is considered that a driving resistance of the drive sprocket 72 or the like increases as the air contained in the oil increases.

Therefore, the power transmission device 10 of the present embodiment includes a plate 85 between the fourth gear 54 and the drive sprocket 72 for preventing the oil swirled up by the fourth gear 54 from splashing on the drive sprocket 72 side.

Figure 3:
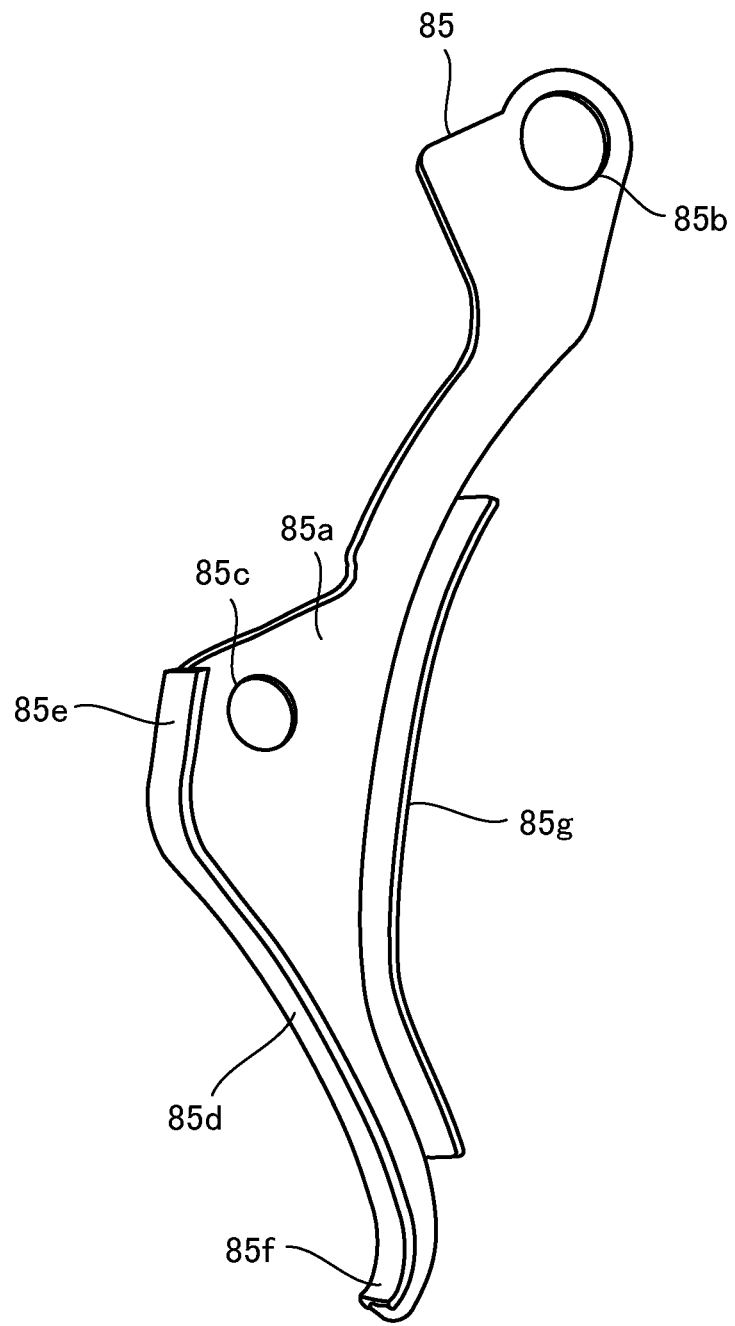
FIG. 3 is a perspective view of a plate.

Hereinafter, the plate 85 will be described in detail with reference to FIGS. 2 and 3. FIG. 3 is a perspective view of the plate 85.

As illustrated in FIG. 3, the plate 85 includes: a main body portion having a flat plate shape; two attachment holes 85*b* and 85*c* formed in the main body portion 85*a*; a first wall portion 85*d* formed at one side edge portion of the main body portion 85*a*; a second wall portion 85*e* formed continuously with one end portion of the first wall portions 85*d*; a third wall portion 85*f* formed continuously with the other end portion of the first wall portions 85*d*; and a fourth wall portion 85*g* formed at the other side edge portion of the main body portion 85*a*. The plate 85 is, for example, a pressed metal component.

As illustrated in FIG. 2, the plate 85 is fastened to the main body portion 81 together with the intermediate cover 83 by two bolts 84 using the attachment holes 85*b* and 85*c* such that the first wall portion 85*d* is located on a fourth gear 54 side and the fourth wall portion 85*g* is located on the drive sprocket 72 side.

In a state where the plate 85 is fixed to the main body portion 81, one end portion side of the first wall portion 85*d* is located on an upper side in the gravity direction (upward), and the other end portion side of the first wall portion 85*d* is located on a lower side in the gravity direction (downward). In addition, the first wall portion 85*d* is formed along an outer periphery of the fourth gear 54.

As described above, in the power transmission device 10, the first wall portion 85*d* is provided between the fourth gear 54 and the drive sprocket 72. Therefore, most of the oil splashed due to the rotation of the fourth gear 54 hits the first wall portion 85*d* and falls downward as indicated by a dashed arrow.

The second wall portion 85*e* is located above the first wall portion in the gravity direction in the state where the plate 85 is fixed to the main body portion 81. In addition, the second wall portion 85*e* is formed to extend toward a direction away from the fourth gear 54.

As a result, the oil swirled up by the fourth gear 54 and splashed to go beyond the first wall portion 85*d* hits the second wall portion 85*e*, and falls downward as indicated by the dashed arrow.

As described above, in the power transmission device 10 of the present embodiment, the oil splashed to go beyond the first wall portion 85*d* can be blocked by the second wall portion 85*e*. Accordingly, it is possible to prevent the oil swirled up by the fourth gear 54 from being splashed on the drive sprocket 72 side and stirred.

Here, the second wall portion 85*e* of the present embodiment is formed to extend toward the direction away from the fourth gear 54. Therefore, a range blocked by the second wall portion 85*e* in a direction in which the oil swirled up by the fourth gear 54 is splashed is larger than that in a case where the second wall portion 85*e* does not extend toward the direction away from the fourth gear 54. Therefore, in the present embodiment, it is possible to efficiently prevent the oil swirled up by the fourth gear 54 from being splashed on the drive sprocket 72 side.

As illustrated in FIG. 2, the second wall portion 85*e* is close to a lower end portion of a flange surface 81*a* of the main body portion 81, and a labyrinth structure is formed by the main body portion 81 and the second wall portion 85*e*.

According to the above, even when a gap is provided between the main body portion 81 and the second wall portion 85*e*, the oil hardly passes through between the main body portion 81 and the second wall portion 85*e*. As a result, it is possible to prevent the oil from passing through between the main body portion 81 and the second wall portion 85*e* while absorbing a dimensional variation and an assembly error of the plate 85.

The third wall portion 85*f* is located below the first wall portion 85*d* in the gravity direction in the state where the plate 85 is fixed to the main body portion 81. In addition, the third wall portion 85*f* is formed to extend toward a direction approaching the fourth gear 54.

Oil adhering to the first wall portion 85*d* and the second wall portion 85*e* is guided by the third wall portion 85*f* and falls to the fourth gear 54 side as indicated by the dashed arrow. Therefore, it is possible to prevent the oil swirled up by the fourth gear 54 from being splashed on the chain 76.

In the state where the plate 85 is fixed to the main body portion 81, one end portion side of the fourth wall portion 85*g* is located on the upper side in the gravity direction (upward), and the other end portion side of the fourth wall portion 85*g* is located on the lower side in the gravity direction (downward). That is, the power transmission device 10 includes the first wall portion 85*d* provided on the fourth gear 54 side of the plate 85, and the fourth wall portion 85*g* provided on the drive sprocket 72 side of the plate 85.

The plate 85 is fixed to the main body portion 81 using the two attachment holes 85*b* and 85*c*, and a third wall portion 85*f* side thereof with respect to the attachment hole 85*c* is not fixed. Therefore, the plate 85 of the present embodiment is provided with the fourth wall portion 85*g* facing the first wall portion 85*d* from the vicinity of the attachment hole 85*c* to the vicinity of the third wall portion 85*f*, thereby improving rigidity of a portion closer to the third wall portion 85*f* than the attachment hole 85*c*. That is, by providing the fourth wall portion 85*g* on the plate 85, vibration of the plate 85 can be prevented, and durability can be improved.

In the present embodiment, the first wall portion 85*d*, the second wall portion 85*e*, and the third wall portion 85*f* are provided on the plate 85, but for example, the first wall portion 85*d*, the second wall portion 85*e*, and the third wall portion 85*f* may be provided integrally with the intermediate cover 83, the main body portion 81, or the cover 82. In addition, the first wall portion 85*d*, the second wall portion 85*e*, and the third wall portion 85*f* may be provided as individual members and attached to the plate 85, the intermediate cover 83, or the like.

In a case where the first wall portion 85*d*, the second wall portion and the third wall portion 85*f* are provided on the plate 85, the first wall portion 85*d*, the second wall portion 85*e*, and the third wall portion 85*f* can be easily manufactured and assembled to the power transmission device 10.

Main functions and effects of the power transmission device 10 implemented as described above will be described collectively.

(1) The power transmission device 10 includes: the case 80 forming the oil bath in which oil is stored; the fourth gear 54 disposed in the case 80 and having at least a part immersed in the oil in the oil bath; the drive sprocket 72 disposed in the case 80 and provided on the radially outer side of the fourth gear 54; the first wall portion 85*d* provided between the fourth gear 54 and the drive sprocket 72; and the second wall portion 85*e* provided above the first wall portion 85*d* in the gravity direction and extending toward the direction away from the fourth gear 54.

According to the above, the oil swirled up by the fourth gear 54 and splashed to go beyond the first wall portion 85*d* can be blocked by the second wall portion 85*e*. Accordingly, it is possible to prevent the oil swirled up by the fourth gear 54 from being splashed on the drive sprocket 72 side and stirred.

(2) The power transmission device 10 includes the third wall portion provided below the first wall portion 85*d* in the gravity direction and extending toward the direction approaching the fourth gear 54.

According to the above, the oil adhering to the first wall portion 85*d* and the second wall portion 85*e* is guided by the third wall portion 85*f* and falls to the fourth gear 54 side. Therefore, it is possible to prevent the oil swirled up by the fourth gear 54 from being splashed on the chain 76.

(3)(4) The power transmission device 10 includes the plate 85, and the first wall portion 85*d* is provided on the plate 85.

According to the above, the first wall portion 85*d* can be easily manufactured and assembled to the power transmission device 10.

(5) The second wall portion 85*e* is provided on the plate 85.

According to the above, the second wall portion 85*e* can be easily manufactured and assembled to the power transmission device 10.

(6) The third wall portion 85*f* is provided on the plate 85.

According to the above, the third wall portion 85*f* can be easily manufactured and assembled to the power transmission device 10.

(7) The power transmission device 10 includes the fourth wall portion 85*g* provided on the drive sprocket 72 side of the plate 85, and the first wall portion 85*d* is provided on the fourth gear 54 side of the plate 85.

According to the above, the rigidity of the third wall portion 85*f* side of the plate 85 is improved. Accordingly, the vibration of the plate 85 can be prevented, and the durability can be improved.

While an embodiment of the invention has been described, the embodiment is merely one of application examples of the invention, and does not intend to limit a technical scope of the invention to a specific configuration according to the embodiment.

For example, in the above embodiment, a case where the device is the power transmission device 10 has been described. However, the device may be, for example, a power transmission device. The power transmission device is a device that contributes to transmission of power, and includes, for example, a transmission, a reduction gear, and the like.

In the above embodiment, a case where the power transmission device 10 includes the first wall portion 85d, the second wall portion 85e, and the third wall portion 85f has been described. However, the power transmission device 10 may not include the third wall portion 85f.

In the above embodiment, the first wall portion 85d, the second wall portion 85e, and the third wall portion 85f provided on the plate 85 are continuous. However, the first wall portion 85d, the second wall portion 85e, and the third wall portion 85f may be independent of one another.

In the above embodiment, the second wall portion 85e is close to the lower end portion of the flange surface 81a of the main body portion 81, and the labyrinth structure is formed by the main body portion 81 and the second wall portion 85e. However, the labyrinth structure may not be formed by the main body portion 81 and the second wall portion 85e. That is, the second wall portion 85e may not be close to the main body portion 81.

DESCRIPTION OF REFERENCE SIGNS

10 power transmission device (device)
54 fourth gear (first rotating body)
72 drive sprocket (second rotating body)
80 case
85 plate
85d first wall portion
85e second wall portion
85f third wall portion
85g fourth wall portion The present application claims a priority of Japanese Patent Application No. 2020-207680 filed with the Japan Patent Office on Dec. 15, 2020, all the contents of which are hereby incorporated by reference.

The invention claimed is:

1. A device, comprising:
a case forming an oil bath in which oil is stored;
a first rotating body that is disposed in the case and has at least a part immersed in the oil in the oil bath;
a second rotating body disposed in the case at a position not immersed in the oil in the oil bath and provided on a radially outer side of the first rotating body;
a plate disposed in the case at a position not immersed in the oil in the oil bath;
a first wall portion provided on the plate between the first rotating body and the second rotating body;
a second wall portion provided above the first wall portion in a gravity direction and extending toward a direction away from the first rotating body; and
a fourth wall portion provided between the first rotating body and the second rotating body and extending in a vertical direction on the plate, wherein
the first wall portion is provided on a first rotating body side of the plate, and
the fourth wall portion is provided on a second rotating body side of the plate.

2. The device according to claim 1, further comprising:
a third wall portion provided below the first wall portion in the gravity direction and extending toward a direction approaching the first rotating body.

3. The device according to claim 1, wherein the second wall portion is provided on the plate.

4. The device according to claim 2, wherein the third wall portion is provided on the plate.

* * * * *